US006341238B1

(12) United States Patent
Modeen et al.

(10) Patent No.: US 6,341,238 B1
(45) Date of Patent: Jan. 22, 2002

(54) ROBUST ENGINE VARIABLE VANE MONITOR LOGIC

(75) Inventors: Douglas P. Modeen; John E. Games, both of Granby; Norman J. Faust, Meriden, all of CT (US)

(73) Assignee: United Technologies Corporation, Windsor Locks, CT (US)

( * ) Notice: Subject to any disclaimer, the term of this patent is extended or adjusted under 35 U.S.C. 154(b) by 0 days.

(21) Appl. No.: 09/164,544

(22) Filed: Oct. 1, 1998

(51) Int. Cl.[7] ......................... G05B 19/18; F01B 25/06; F01B 25/00; F01B 25/20; F01B 25/26

(52) U.S. Cl. ............................ 700/66; 415/36; 415/16; 415/17; 415/42; 415/48; 415/118; 73/1.79; 73/118.2

(58) Field of Search ....................... 700/66, 56; 415/17, 415/15, 16, 36, 42, 48, 118; 137/486; 62/201; 73/118.2, 1.79

(56) References Cited

U.S. PATENT DOCUMENTS 4,279,568 A * 7/1981 Munroe ....................... 415/17
4,610,599 A * 9/1986 Long ........................... 415/15
5,355,691 A * 10/1994 Sullivan ...................... 62/201
5,553,997 A * 9/1996 Goshaw ....................... 415/17
5,573,032 A * 11/1996 Lenz .......................... 137/486
5,618,160 A * 4/1997 Harada ........................ 415/17
5,851,103 A * 12/1998 Harada ........................ 415/17
5,873,696 A * 2/1999 Harada ....................... 415/148
5,927,939 A * 7/1999 Harada ........................ 415/17
5,938,401 A * 8/1999 Modeen ....................... 415/36
5,947,680 A * 9/1999 Harada ........................ 415/17
6,131,449 A * 10/2000 Modeen et al. ............ 73/118.1

* cited by examiner

*Primary Examiner*—William Grant
*Assistant Examiner*—Ronald D Hartman, Jr.

(57) ABSTRACT

A method of testing an actuation system for positioning an actuator, the actuation system including a primary electronic system, a secondary hydro-mechanical system is disclosed. The method includes the steps of measuring the actual position of the actuation device as set by the primary electronic system; measuring the system inputs and computing an ideal actuator position based thereon; determining the difference between the actual actuator position and the ideal position. The difference is then compared to a first threshold value which represents a disturbance beyond which the system cannot safely operate. Control is transferred from the primary control to the secondary control if the difference exceeds the first threshold. If the difference is less than the first threshold, the difference is compared to a second threshold value which represents an operating condition that can be tolerated for a period of time. Control is transferred from the primary control to secondary control if the difference exceeds the second threshold for longer than the time period.

7 Claims, 3 Drawing Sheets

ROBUST ENGINE VARIABLE VANE MONITOR LOGIC

TECHNICAL FIELD

This invention is directed to a control system for verifying the proper operation of aircraft engine/surface actuator controls, and more particularly, to a control system for verifying the proper operation of a control associated with the inlet guide vanes (IGVCS) of an aircraft engine.

BACKGROUND ART

Increased demands for improved aircraft performance and reliability have resulted in the development of electronic controllers having multiple levels of redundant channels. These redundant channels can consist of redundant electronic channels and/or mechanical channels. In order to utilize the reliability benefits of multi-channel systems, various hardware and software built-in test (BIT) methodologies have been developed to provide high levels of fault coverage.

More specifically, for some modern aircraft, the inlet guide vane control system (IGVCS) has a dual lane architecture comprised of an electronic primary lane and a hydro-mechanical secondary lane. The IGVCS controls the inlet guide vane position as a function of engine speed adjusted for air inlet temperature. The electronic primary lane consists of two redundant channels, an active and a standby channel. The hydro-mechanical secondary lane serves as a back-up in the event of a failure of the two electronic channels.

In order to ensure proper operation of the IGVCS there are several levels of fault coverage provided by the BIT diagnostics. The first level is referred to as "In-Line Built-In Test " (ILBIT). The ILBIT of the electronic primary lane includes signal range checks, processor checks, memory checks, output wrap around checks, etc., to isolate any faults within a specific channel.

The second level of fault coverage is provided by a cross channel comparison of the processed inputs and outputs of the active and standby channels to detect failures not detected by the ILBIT (XCHBIT). The second level is not capable of isolating the failure to one of the electronic channels and therefore must switch control from the electronic primary lane to the hydro-mechanical secondary lane.

A third level of fault coverage serves as a "last line of defense" against primary lane failure by utilizing the difference between simulated vane position, predicted in real time, and actual vane position to detect system failures which are not detectable by the ILBIT and XCHBIT. This difference is then evaluated using a Pass/Fail criteria to determine whether the actuator is tracking properly. This logic is present in both channels of the primary control lane so that if a failure occurs which causes the actuator position to track incorrectly, either channel has the capability to detect this and initiate a switch over to the secondary control lane.

The problem with the present art is that any tolerance which meets the above described criteria is not necessarily robust in the presence of external vane aerodynamic disturbances. In particular, this third level of coverage cannot distinguish between an actual fault and a naturally occurring aerodynamic disturbance such as surge or stall, resulting in erroneous transfer to the secondary/backup, reducing the reliability of the system by incorrectly concluding a system fault existed. For some engines, the probability of occurrence of a surge condition is much higher than the probability of failure of the vane hardware.

When transfer occurs a fault is indicated and maintenance action is required. Nuisance faults caused by false transfers result in wasted time and monetary resources and limits aircraft availability.

Therefore, there exists a need, for a fault detection system that can distinguish between actual system failures and temporary system disturbances, thus reducing system false alarm rates.

DISCLOSURE OF INVENTION

The primary object of this invention is to provide an improved control system for verifying the proper operation of aircraft engine/surface actuator controls.

Another object of this invention is to provide an improved methodology which can distinguish between actual system faults and temporary system disturbances.

A further object of this invention is to reduce aircraft maintenance time associated with nuisance faults.

Still another object of this invention is to provide BIT diagnostics for an IGVCS utilizing filtering of a comparison between a simulated inlet guide vane position and an actual inlet guide vane position to prevent transfer of control from the primary to secondary lane in the event of a false alarm, without compromising the ability to detect, in a timely manner, system faults and the appropriate corrective action.

The foregoing objects and following advantages are achieved by the test method of the present invention for distinguishing between actual system failures and temporary system disturbance not caused by failures.

The method includes the steps of initializing the primary system upon engine start; reading system inputs, calculating an ideal system output, reading the actual aircraft engine/surface actuation control position set by the primary control, calculating the difference between the ideal system output and actual control position setting, comparing the difference to a severe disturbance threshold, switching system control to the secondary/backup system if the difference exceeds the severe disturbance threshold, if the difference is less than the severe disturbance threshold, comparing the difference to a mild disturbance threshold and switching control to the secondary/backup system if the difference exceeds the mild disturbance threshold for greater than a predetermined time period.

BEST MODE FOR CARRYING OUT THE INVENTION

Figure 1:
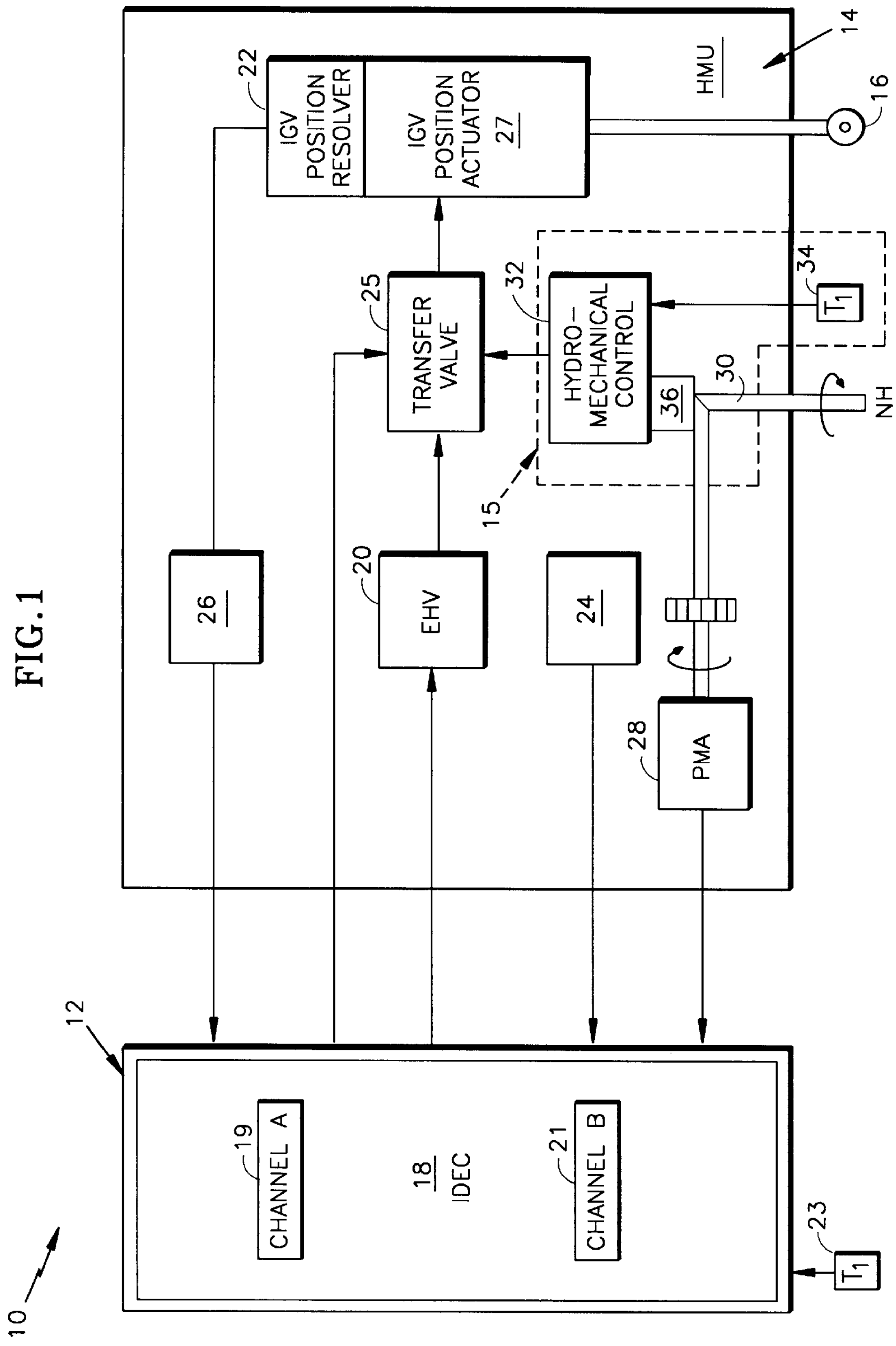
FIG. 1 is a schematic diagram of one system with which the method of the present invention is used.

Referring now to the drawings in detail, there is shown in FIG. 1 a schematic diagram of one system with which the method of the present invention is used, designated generally as 10. System 10 includes a primary electronic lane 12, hereinafter primary lane, and a secondary hydro-mechanical lane 15, hereinafter secondary lane, used for controlling the position of inlet guide vanes (IGV) 16 of an engine (not shown).

The primary lane 12 includes the IGV digital electronic control (IDEC) 18, which consists of redundant channels A 19 and B 21, and the hydro-mechanical unit (HMU) 14 exclusive of the secondary lane 15. The HMU 14 provides hydraulic force actuation for IGV 16 positioning during primary lane 12 operation and both control and actuation during secondary lane 15 operation. The method of the present invention prevents a false error determination from transferring control from the primary lane 12 to the secondary lane 15.

The primary lane 12 consists of an inlet guide vane digital electronic control (IDEC) 18, electro-hydraulic servo valve 20 to command IGV 16 position via IGV position actuator 27. The primary lane 12 schedules IGV 16 position as a function of engine speed (NH) corrected for engine inlet air temperature (T1). Temperature at the engine inlet is provided by RTD probe 23 while engine speed is provided by magnetic speed sensor 24, sensing the speed of shaft 30 which is driven by the engine.

The transfer valve 25 is responsive to a command from the primary lane 12 for selecting whether the primary lane 12 or secondary lane 15 controls IGV 16 position. In addition, an IGV position resolver 22 provides IGV 16 position feedback to the primary lane 12 via bus 26. Finally, a permanent magnet alternator (PMA) 28, located in the HMU 16, provides power to the IDEC 18. The PMA 28 is driven by shaft 30.

The secondary lane 15 comprises a hydro-mechanical control 32 which in combination with IGV actuator 27 provides hydraulic force actuation for positioning of the inlet guide vane 16 during the secondary lane 15 operation. Secondary lane 15 senses engine air inlet temperature via a liquid bulb temperature device 34 and engine speed via a flyball actuator 36, which is driven by shaft 30. The secondary lane 15 continually schedules inlet guide vane position, even during operation and control by the primary electronic 12 lane, so as to maintain readiness in the event of primary lane 12 failure. However, secondary lane 15 remains isolated from IGV actuator 27 until power is removed from the transfer valve 25 due to a failure in the primary lane 12 or the primary lane 12 commands a switch to the secondary lane 15.

The IDEC 18 of the primary electronic lane 12 has two operational channels and starts up automatically upon rotation of shaft 30 which causes PMA 28 to provide power to the IDEC 18. The IDEC 18 takes control of system 10 by powering up either of the redundant channels 19 or 21 and providing an electrical signal to the transfer control valve 25. The dual channel architecture operates in an active/standby mode such that one channel is active and the other is in standby. If a failure occurs in one of the channels, an automatic transfer to the standby channel is made. In the case where both channels fail, or if a fault is detected which cannot be isolated to either channel, control is automatically transferred to the secondary lane 15 by removal of power or by command to the transfer control valve 25.

In the preferred embodiment the BIT software is resident in the IDEC 18 but may be located in other portions of the control. The method of the present invention is performed as part of the normal operation of the control. The method 100 is illustrated in the flow chart of FIG. 2. As the engine starts shaft 30, shown in FIG. 1 rotates in response to engine rotation. At an engine speed of approximately 23.75% of full speed the PMA 28 will provide power to the IDEC 18 and the IDEC 18 will initialize. Channel A 19 or channel B 21 will begin to control IGV 16. For the discussions here it is assumed that channel A 19 is controlling. Therefore, channel A will energize the transfer valve 25 and electro-hydraulic valve 20 to place the primary lane in control of the IGV 16 and set the IGV 16 to an initial angle. At a speed equal to 31.25%, IDEC 18 initialization is complete.

As shown in S1, the primary control reads in T1, NH. The actual IGV angle commanded by the primary lane 12 is also read from IGV position resolver 22. The BIT software then calculates an ideal IGV angle as shown in S2. The difference between IGV actual and IGV ideal is then calculated as shown in S3. S4 illustrates application of a first filter. The IGV difference is compared to a severe disturbance threshold 38. This threshold represents a disturbance that cannot be safely tolerated by the system. If IGV difference exceeds the severe disturbance threshold 38 the IDEC 18 switches control of the IGV 16 from the primary lane 12 to the secondary lane 15 as shown in step S5.

Figure 2:
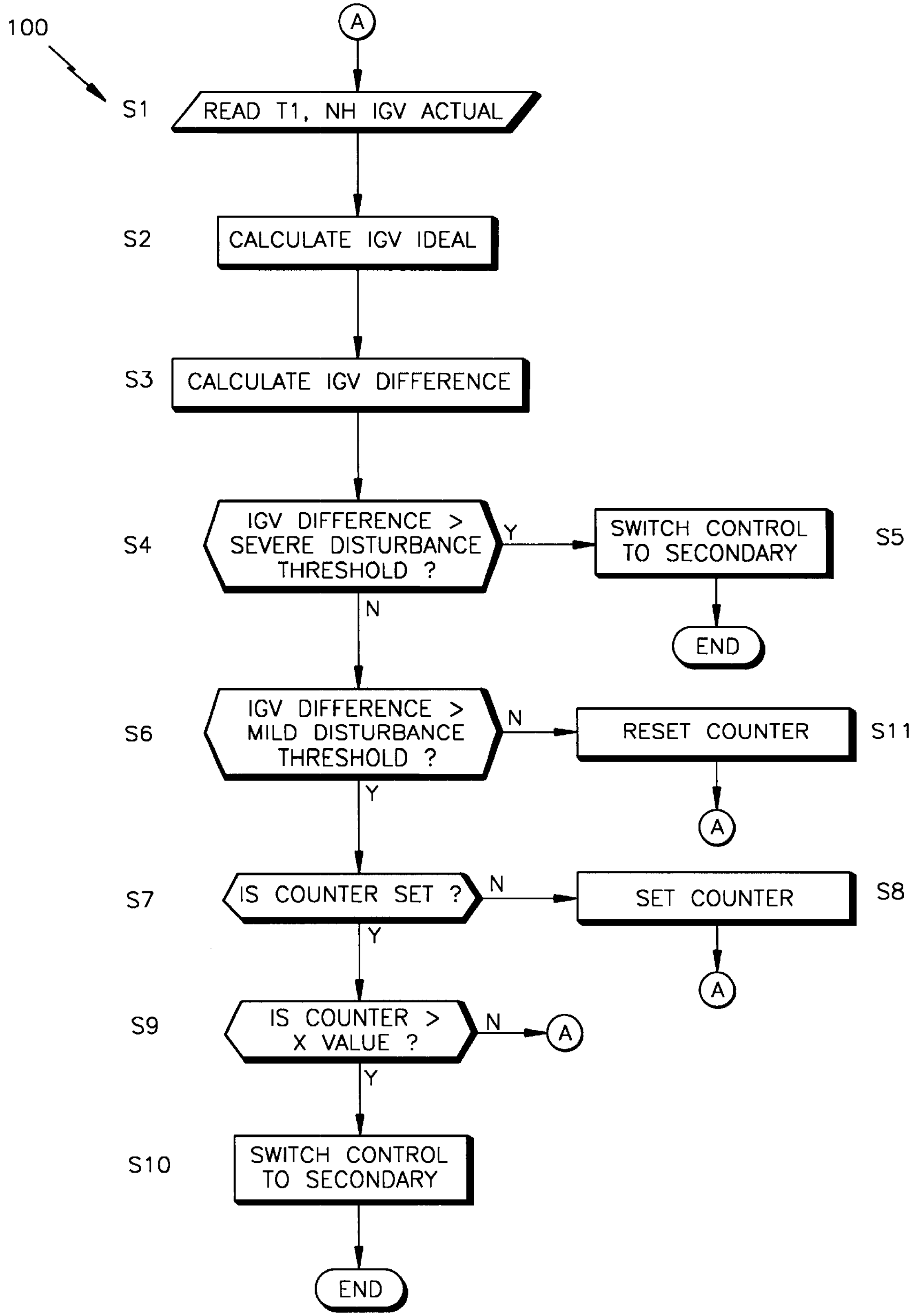
FIG. 2 is a flowchart of the subject method.

If IGV difference is less than the severe disturbance threshold 38, then IGV difference is compared to the mild disturbance threshold 40 as shown in S6 of FIG.2. The mild disturbance threshold 40 is an out of tolerance condition that can be tolerated by the system for a finite period of time. Such a disturbance might be a surge condition due to pilot action or sudden change in the environment. If IGV difference is greater than the mild disturbance threshold 40 then the duration of the disturbance is tracked. In S7 the counter is queried to determine if it has already been set indicating an ongoing disturbance. If the counter is not set, as in a newly detected disturbance, the counter is set as shown in S8, and control returns to S1. If the counter is already set, the duration of the disturbance is determined as in S9.

If the value of the counter exceeds the acceptable duration for a mild system disturbance condition then the IDEC 18 switches command from the primary lane 12 to the secondary lane 15 as illustrated in S10 and the test is complete. If the counter is less than the maximum acceptable duration, then the program returns to S1 and the process is repeated.

If at any time prior to switching of control from the primary lane 12 to the secondary lane 15, the IGV difference is less than the mild disturbance threshold 40 of S6, the counter is reset as shown in S11 and the process continues at S1.

Figure 3:
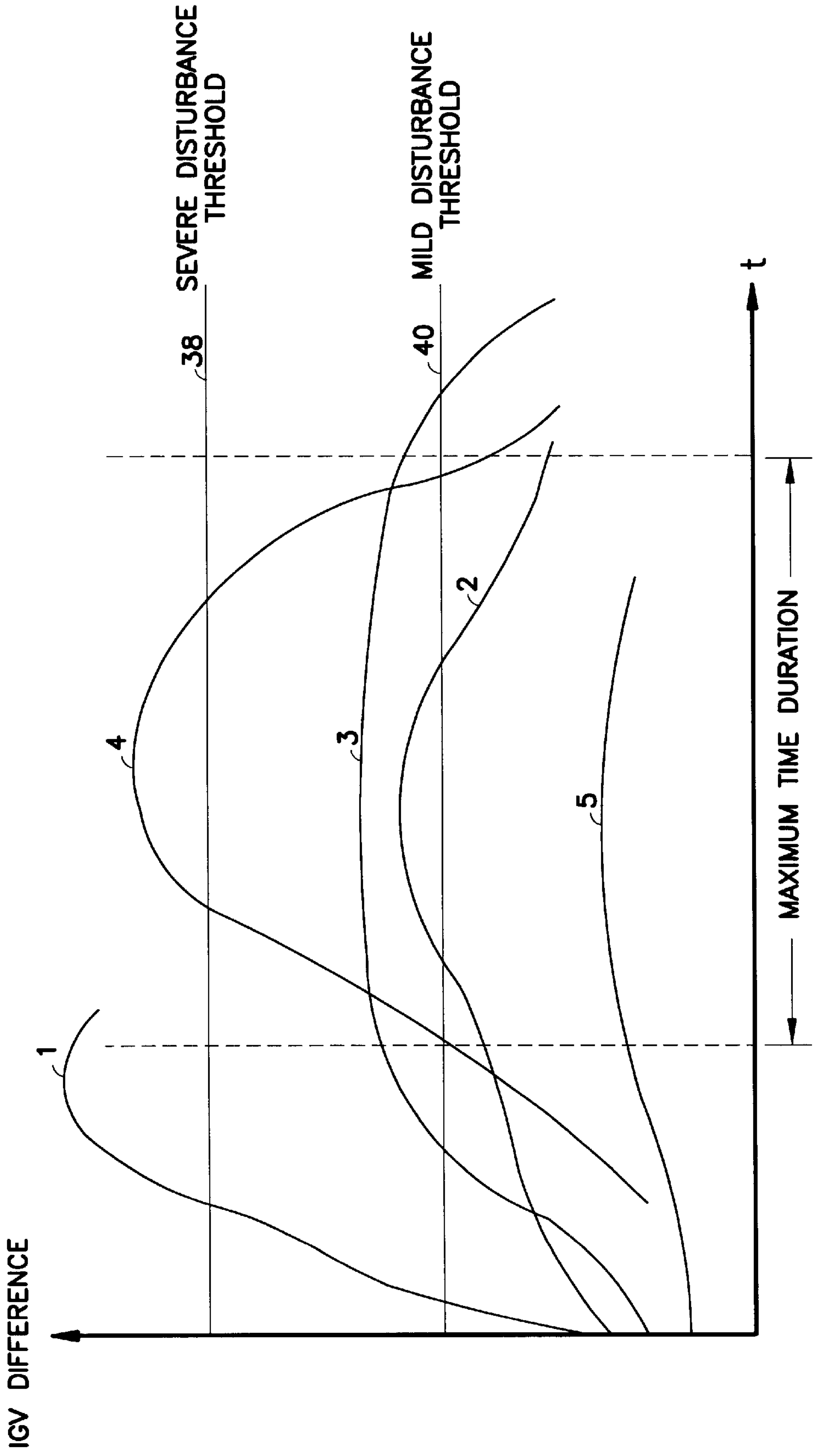
FIG. 3 is a graph of IGV angle difference over time.

FIG. 3 illustrates several possible scenarios for system disturbances. Curve 1 illustrates a real system fault wherein the IGV difference is greater than the severe system disturbance threshold 38. IGV 16 control is transferred from the primary lane 12 to the secondary lane 15. Curves 2 and 3 show an IGV difference that is greater than the mild disturbance threshold 40 but less than the severe disturbance threshold 38. The system will track the time duration of the disturbance. If the IGV difference falls below the mild disturbance threshold 40 within a predetermined time, as in curve 2, then control remains with the primary lane 12. If however, IGV difference continues to exceed the mild disturbance threshold 40 as in curve 3, then control is transferred from the primary lane 12 to the secondary lane 15. By proper choice of the maximum duration the majority of the failures are represented by curve 2 and hence do not result in a false alarm. Maximizing the time allowed without causing hazardous or undesirable operation is the key to obtaining the benefit of the invention. Curve 3 represent some limited number of false alarms. However, the majority of false alarms is eliminated by selecting the proper maximum time duration.

Curve 4 represents a system disturbance that exceeds the severe disturbance threshold 38. This disturbance is not a real fault as indicated by the recovery of the system. The system cannot distinguish between this failure and a real system failure and therefore control is transferred from the primary lane 12 to the secondary lane 15. By proper adjustment of the mild and severe disturbance thresholds the occurrence of these false alarms is minimized. Curve 5 represents a failure detected and accommodated by the ILBIT and XCHBIT. The vanes remain within the mild disturbance threshold 40.

The primary advantage of this invention is an improved method which can distinguish between actual system faults and temporary system disturbances.

Another advantage of this invention is that an improved system is provided for an IGVCS which utilizes filtering of a comparison between a simulated inlet guide vane position and an actual inlet guide vane position to improve system reliability.

A further advantage of this invention is that it reduces maintenance associated with nuisance faults and therefore increases aircraft availability.

Although the invention has been shown and described with respect to a best mode embodiment thereof, it should be understood by those skilled in the art that the foregoing and various other changes, omissions and additions in the form and detail thereof may be made without departing from the spirit and scope of the invention.

What is claimed is:

1. A method of testing a control for a system for positioning an actuator comprising:

computing an ideal actuator position;

measuring an actual actuator position;

determining a difference between said ideal actuator position and said measured actual actuator position;

comparing said difference to a first threshold value;

indicating a first failure if said difference exceeds said first threshold;

comparing said difference to a second threshold value if said difference does not exceed said first threshold value;

indicating a second failure if said difference exceeds said second threshold for a time exceeding a time limit.

2. The method of claim 1 wherein said control includes a primary and a secondary channel, the method further comprising transferring control from the primary control to the secondary control upon indication of either said first or said second failure.

3. The method of claim 1 said first threshold value comprises a maximum difference that can be safely tolerated by the system.

4. The method of claim 1, said second threshold value comprises an out of tolerance difference that cannot be safely tolerated by the system for said time greater than said time limit.

5. A method of testing an actuation system for positioning an inlet guide vane, the actuation system including a primary system, a secondary system, and a means for selecting the primary and secondary system, the primary and secondary system being responsive to an inlet temperature and an engine speed for setting a position of the inlet guide vane, the method comprising:

measuring the position of the inlet guide vane;

measuring the inlet temperature;

measuring the engine speed;

computing an ideal position for the inlet guide vane based on said inlet temperature and said engine speed;

determining a difference between said position and said ideal position;

comparing said difference to a first threshold value and selecting the secondary system if said difference exceeds said first threshold;

comparing said difference to a second threshold value and selecting the secondary system if said difference exceeds said second threshold for a time exceeding a time limit.

6. The method of claim 5, said first threshold value comprises a maximum difference that can be safely tolerated by the system.

7. The method of claim 5, said second threshold value comprises an out of tolerance difference that cannot be safely tolerated by the system for said time greater than said time limit.

* * * * *